March 4, 1958 O. W. SMITH 2,825,577
TRAILER AXLE SPRING SUSPENSION
Filed Aug. 22, 1955 3 Sheets-Sheet 1
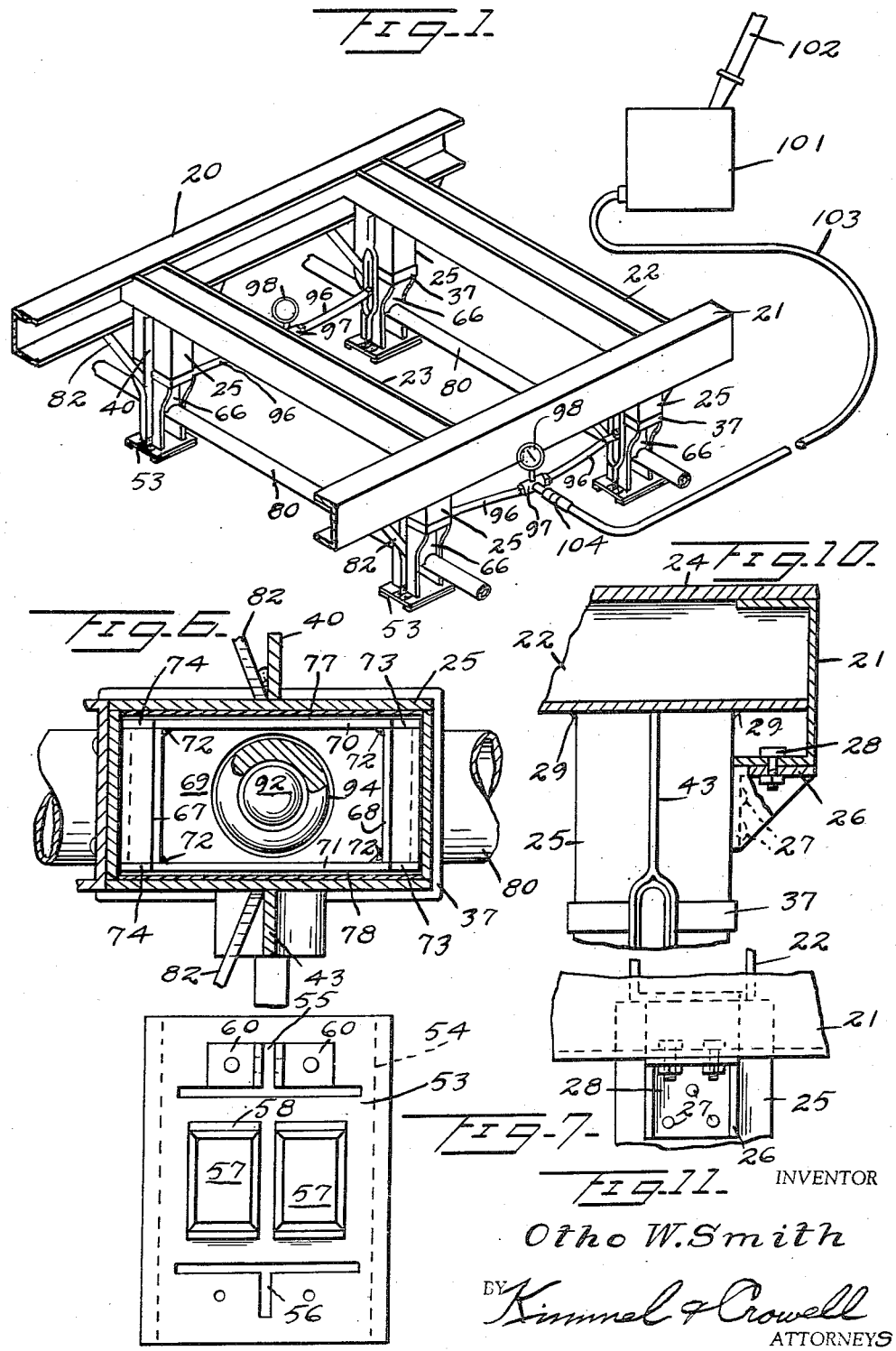
INVENTOR
Otho W. Smith
BY Kimmel & Crowell
ATTORNEYS March 4, 1958
O. W. SMITH
2,825,577
TRAILER AXLE SPRING SUSPENSION
Filed Aug. 22, 1955
3 Sheets-Sheet 2
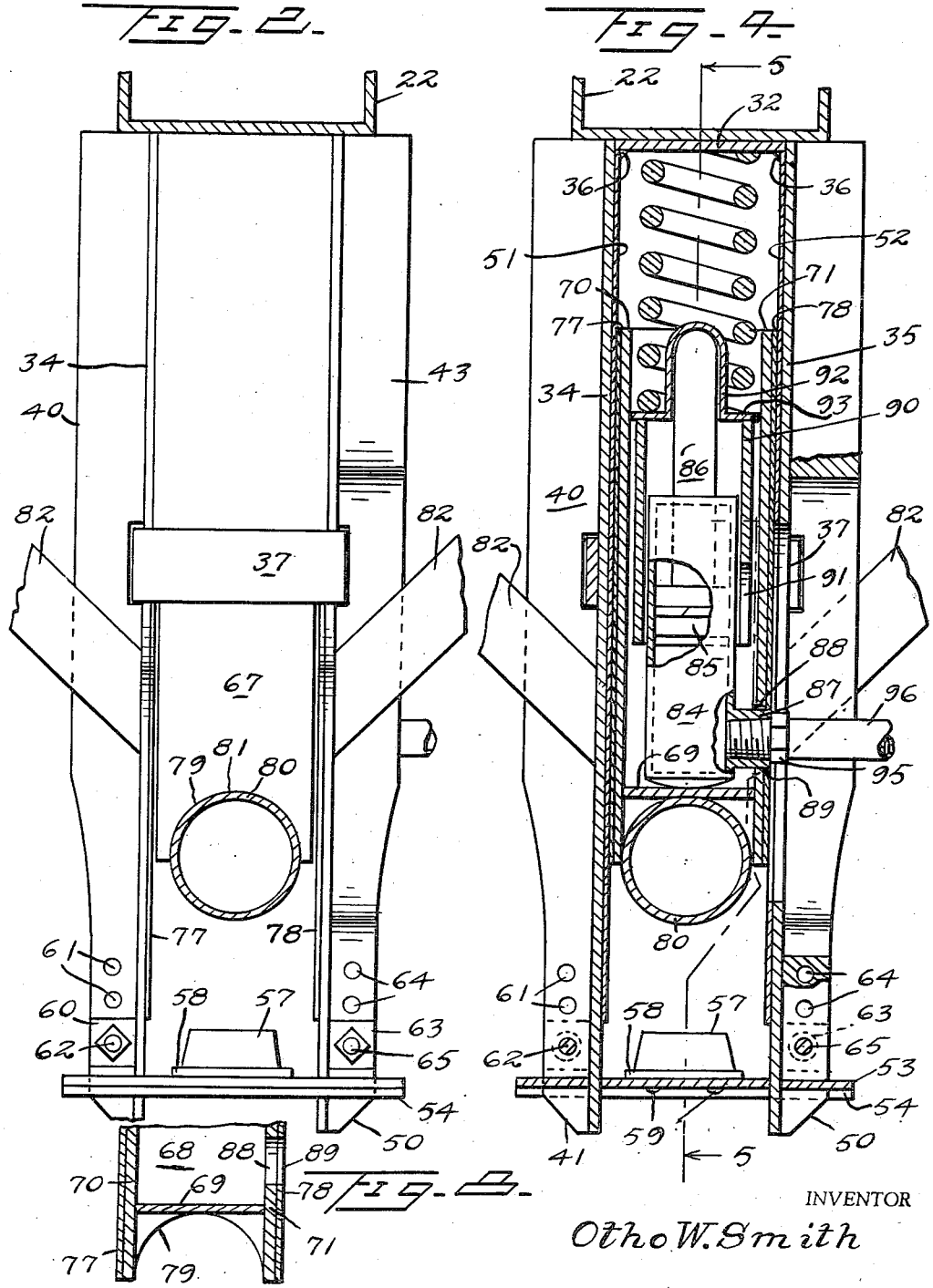
INVENTOR
Otho W. Smith
BY Kimmel & Crowell
ATTORNEYS

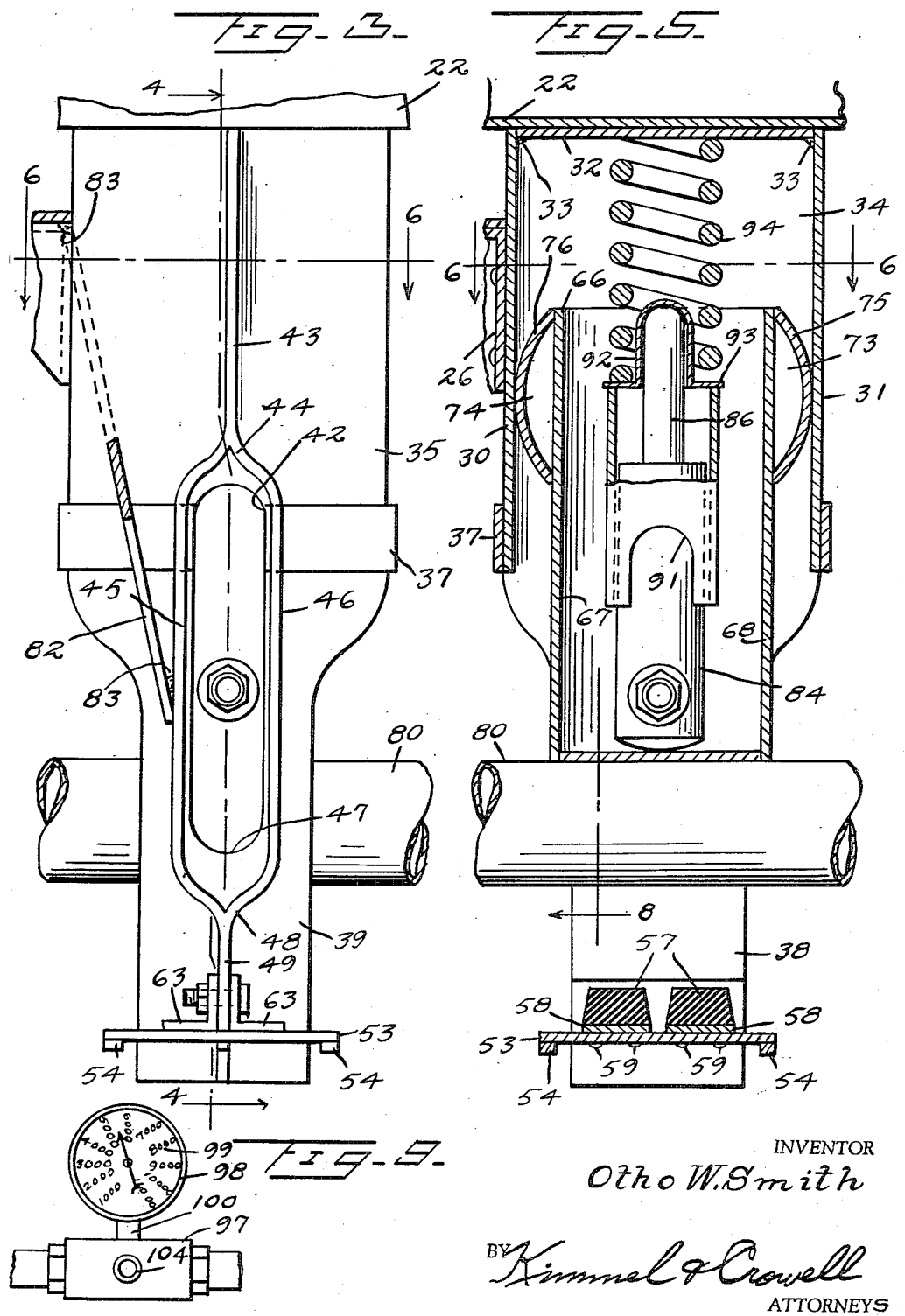

United States Patent Office 2,825,577
Patented Mar. 4, 1958

2,825,577

TRAILER AXLE SPRING SUSPENSION

Otho W. Smith, Bedford, Ind.

Application August 22, 1955, Serial No. 529,683

3 Claims. (Cl. 280—104.5)

The present invention relates to trailer spring suspensions, and more particularly to the spring suspension of the running gear positioned at the rear of a tractor drawn trailer.

The primary object of the invention is to provide a spring suspension for the running gear of a trailer having two or more axles wherein means are combined therewith for hydraulically equalizing the load between the wheels on one side of the vehicle and a like means for equalizing the load on the wheels on the other side of the vehicle, and a mechanical means for equalizing the load on the wheels on opposite sides of the vehicle.

Another object of the invention is to provide a structure of the class described wherein the weight of the load on the trailer can be directly read on a hydraulic pressure gauge calibrated in pounds.

A further object of the invention is to provide a structure of the class described in which the trailer may be raised or lowered by pumping or bleeding fluid from a hydraulic system permitting leveling of the trailer to a loading dock or reducing its over-all height to permit passage under a low underpass.

A still further object of the invention is to provide a spring suspension for a trailer combined with a hydraulic load supporting mechanism which will reduce the road shock on the trailer when running empty.

Still another object of the invention is to produce a hydraulically suspended variable equalizing coil spring carrier for the running gear of a trailer or truck.

Another object of the invention is to produce a running gear spring suspension for a vehicle in which spring shackles and torque arms with their accompanying wear surfaces are eliminated.

A further object of the invention is to provide a spring suspension system for vehicle running gears which will decrease the over-all weight of the vehicle while increasing the load carrying capacity thereof.

A still further object of the invention is to produce a structure of the class above described in which the normal maintenance and replacement of worn parts is reduced to a bare minimum without sacrificing the stability of the vehicle.

Other objects and advantages will become apparent in the following specification when considered in the light of the attached drawings, in which:

Figure 1 is a diagrammatic perspective view of the invention shown attached to a portion of a trailer frame with parts broken away for clarity;

Figure 2 is an enlarged side elevation of one of the suspension units with parts broken away for clarity;

Figure 3 is an enlarged front elevation with parts broken away for clarity;

Figure 4 is a longitudinal vertical cross-section taken along the line 4—4 of Figure 3, looking in the direction of the arrows;

Figure 5 is a transverse vertical cross-section taken along the line 5—5 of Figure 4, looking in the direction of the arrows;

Figure 6 is a horizontal cross-section taken along the lines 6—6 of Figures 3 and 5, looking in the direction of the arrows;

Figure 7 is an enlarged top plan view of the retainer plate;

Figure 8 is a fragmentary longitudinal cross-section taken along the line 8—8 of Figure 5, looking in the direction of the arrows;

Figure 9 is an enlarged fragmentary side elevation of the pressure gauge and the coupling to which it is attached;

Figure 10 is an enlarged rear elevation of one of the units showing its attachment to the trailer frame, partly broken away and partly in section, and Figure 11 is an enlarged fragmentary side elevation of the attachment of the unit to the trailer frame.

Referring now to the drawings in detail wherein like reference numerals indicate like parts throughout the several figures, the reference numeral 20 indicates a side rail of a trailer or truck, a second side rail 21 is positioned parallel to the side rail 20 and spaced apart therefrom. Cross members 22 and 23 are secured to the side rails 20 along with other side members (not shown) and form the frame for the vehicle as well as a support for the flooring 24 thereof.

A rectangular spring suspension housing 25 is secured to the side members 20 and 21 by means of angular brackets 26 which may be welded or secured by fasteners 27 to the housing 25 and welded or secured by the fastener 28 to the side members 20 and 21. The housing 25 is further secured to the cross members 22 and 23 adjacent opposite ends thereof by welding 29 or the like. The housings 25 are positioned in pairs on opposite sides of the vehicle with one pair of housings 25 being provided for each axle to be utilized. The housing 25 comprises a pair of spaced-apart end plates 30 and 31 which are parallel to each other and perpendicular to the cross member 22. A rectangular top plate 32 is positioned between the end plates 30 and 31 and secured thereto by means of welding 33 or the like. The side edges of the end plates 30 and 31 are joined on one side by means of a side plate 34 and the opposite end edges are connected by a side plate 35, with the side plates 34 and 35 extending parallel to each other a substantial distance greater than the end plates 30 and 31. The side plates 34 and 35 are likewise secured to the top plate by means of welding 36 or the like. A reinforcing band 37 completely encompasses the side plates 34 and 35 and the end plates 30 and 31, at the bottom edge of the end plates 30 and 31 to prevent spreading and breaking of the housing 25. The side plate 34 is provided with a reduced width lower portion 38 and the side plate 35 is provided with a reduced width lower portion 39. A web 40 is secured along the transverse center of the side plate 34 and extends from the top to the bottom edge thereof at right angles thereto with the lower end beveled at 41 for reasons to be later described.

Side plate 35 is slotted as at 42 with a vertically extending slot and is reinforced with a web 43 which is bifurcated at 44 to form a portion 45 and a portion 46 spaced apart therefrom extending along opposite sides of a slot 42. At the lower end 47 of the slot 42 the portions 45 and 46 of the web 43 are joined as at 48 to form a single web 49 beveled at 50 on the lower portion of the side plate 35. The side plates 34 and 35 are provided with wear plates 51 and 52, respectively, which extend throughout most of the length of the side plates 34 and 35.

A retainer member 53 is provided with edged reinforcing element 54 along the end edges thereof and with a T slot 55 adjacent one side edge thereof and a T slot 56 adjacent the other side edge thereof. A pair of rubber bumper blocks 57 are secured by means of base plates 58 and securing elements 59 to the retainer member 53 on the face thereof opposite the reinforcing elements 54.

T slot 55 is adapted to engage over the side plate 34 with the web 40 extending therethrough. A pair of angle brackets 60 are mounted on the retainer member 53 and extend upwardly therefrom in spaced apart relation to receive the lower end portion of the web 40 therebetween. The web 40 is provided with a series of transverse apertures 61 and the angle brackets 60 are secured thereto by means of a fastener 62. A pair of angle brackets 63 similar to the angle brackets 60 are secured to the upper face of the retainer member 53 adjacent the slot 56 in spaced apart relation to receive the portion 49 of the web 43 therebetween. A series of apertures 64 extend transversely through the web 49 and the brackets 63 are secured thereto by means of securing element 65. Obviously the retainer member 53 may be vertically adjusted as desired.

A rectangular axle guide member 66 is provided with a pair of spaced apart end walls 67 and 68, a bottom wall 69 secured between the end walls 67 and 68, and a pair of side walls 70 and 71. The side walls 70 and 71 are secured to the side walls 67 and 68 at the four corners thereof by means of welding 72 or the like. Side walls 70 and 71 have arcuate end edge portions 73 and 74 with a curved plate 75 extending between one pair of arcuate end portions 73 and a curved plate 76 extending between the opposed pair of arcuate end portions 74 as is evident in Figures 5 and 6.

The side plates 70 and 71 are provided with wear plates 77 and 78, respectively, which are normally in engagement with the wear plates 51 and 52 on the side plates 34 and 35. The end plates 67 and 68 have an arcuate cutout portion 79 at the lower ends thereof to receive an axle 80 which is welded as at 81 to the side plates 67 and 68. The axle 81 is further secured by welding or the like to the side plates 70 and 71 and the bottom plate 69 to securely fasten the axle guide member 66 to the axle 80. The axle guide member 66 being adapted to reciprocate vertically within the housing 25 and to tilt therein about an imaginary longitudinal horizontal pivot with the arcuate portions 73 and 74 permitting the guide member 66 to pivot within the confines of the housing 25 to the limit of the framework of the trailer.

A brace 82 is extended from each of the webs 40 and 43 to the side members 20 and 21, as best illustrated in Figure 1. The braces 82 are secured by welding 83 or the like.

A hydraulic cylinder 84 is positioned within the guide member 66 and extends upwardly therein. A piston 85 is mounted within the hydraulic cylinder 84 for reciprocation therein and is connected to a piston rod 86 which extends from the top end of the cylinder 84. An internally threaded boss 87 extends laterally of the cylinder 84 and projects through an opening 88 in the side plate 71, and an opening 89 in the wear plate 78.

A cylindrical guide 90 is positioned over the hydraulic cylinder 84 and is provided with a slot 91 opening from the lower edge of the guide 90 to permit the guide 90 to extend downwardly around the hydraulic cylinder 84 with the boss 87 extending into the slot 91. An inverted cup 92 is positioned over the piston rod 86 and has a flange 93 extending outwardly therefrom perpendicular to the axis of the cup 92. The flange 93 is secured to the top of the guide 90 by means of welding or the like, and the cup 92 is adapted to engage over the piston rod 86 and be supported thereby. A coil spring 94 is positioned in contact with the flange 93 at one end encompassing the cup 92 and engaging against the top plate 32 at the other end to bias the axle guide 66 away from the top plate 32. A coupling 95 having a hose 96 extending therefrom is threaded into the internally threaded boss 87 of the hydraulic cylinder 84. A center coupling 97 is secured to the opposite end of the hose 96 midway between a pair of the housings 25. A pressure gauge 98 calibrated as at 99 in pounds of weight is secured to the coupling 97 by means of a nipple 100.

It should be understood, of course, that the pressure gauge 98 can be secured to any point on the vehicle including the cab of the tractor truck and connected thereto by means of a flexible line (not shown). A hydraulic pump 101, operated by a handle 102, is adapted to be connected through a flexible hose 103 and a quick detachable coupling 104 to the coupling 97 to permit hydraulic fluid to be pumped into the hydraulic cylinders 84 or removed therefrom as desired.

Each of the hydraulic cylinders 84 on one side of the vehicle is connected by means of a hose 96 so that the fluid pressures therein are equal so that an equal load will be supported by the end of the axle 80 under each of the hydraulic cylinders 84 on one side of the vehicle. Should one wheel of the vehicle strike a bump or otherwise become loaded in excess of the other wheels on the same side of the vehicle, the hydraulic pressure in the cylinder supporting the axle of that side of the vehicle will increase momentarily, but due to the hose 97 the increased pressure will equalize with all of the other cylinders 84 on the same side of the vehicle and the increased load will be equally distributed.

While only two axles 80 and two housings 25 have been illustrated, it is obvious that any number of additional axles can be added to the system, as desired. The loading of the vehicle from side to side is equalized due to the construction of the guides 66 which permit the axle 80 to rock laterally of the vehicle to accommodate the wheels of the vehicle to loads which are applied unequally transversely of the vehicle. It should be understood that the construction herein illustrated, while showing axles 80 of a wheel carrying character, driving axles could be substituted therefor as desired.

Having thus described the preferred embodiment of the invention, it should be understood that numerous modifications and structural adaptations may be resorted to without departing from the scope of the appended claims.

What is claimed is:

1. In a suspension system for wheeled trailer vehicles of the type having a transverse rigid axle and a longitudinal frame, a rectangular tubular housing secured to said frame and depending therefrom, a rectangular box mounted for vertical reciprocation in said housing, means on said box guiding said box in said housing whereby said box may have limited transverse pivotal movement in said housing, said box having one end of said rigid axle secured therebeneath, a pair of arms integrally formed on the lower end of said housing in longitudinally spaced parallel relationship, a retainer plate detachably secured to the lower ends of said arms in vertically adjustable relation, said retainer plate underlying said axle, and means in said housing spring biasing said box downwardly therein, said last named means including a coil spring seated against said housing at one end and against a hydraulically adjustable seat in said box at the other end.

2. A device as claimed in claim 1 wherein one of said housings is provided for supporting each end of a pair of parallel axles, and means extending between the hydraulically adjustable seats of the housings supporting adjacent ends of said pair of axles for equalizing the load on each of said axles.

3. A device as claimed in claim 1 wherein replaceable wear plates are interposed between said box and said housing for guiding said box in said housing.

References Cited in the file of this patent

UNITED STATES PATENTS

| | | |
|---|---|---|
| 1,747,902 | Marcum | Feb. 18, 1930 |
| 1,985,414 | Judd | Dec. 25, 1934 |
| 2,379,388 | Thornhill | June 26, 1945 |
| 2,560,625 | Boggs | July 17, 1951 |
| 2,638,358 | Larison | May 12, 1953 |